Patented Oct. 21, 1947

2,429,392

UNITED STATES PATENT OFFICE 2,429,392

BIS (AMINO METHYL PROPYL) SULFIDE

Oliver W. Cass, Niagara Falls, N. Y., assignor to E. I. du Pont de Nemours & Company, Wilmington, Del., a corporation of Delaware No Drawing. Original application March 2, 1945, Serial No. 580,700. Divided and this application January 24, 1947, Serial No. 724,253

1 Claim. (Cl. 260—583)

This invention relates to the production of sulfur-containing organic compounds, more particularly, organic compounds having a sulfur linkage and terminal reactive groups.

This is a division of my copending application Serial No. 580,700 filed March 2, 1945.

It is primarily an object of this invention to produce an organic compound having terminal reactive groups and a sulfur linkage, which compound has a high thermal stability.

Other objects of this invention will appear from the description which follows.

The objects of this invention are accomplished by producing an organic compound having the formula:

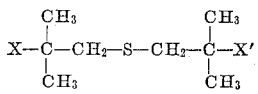

in which X and X' are like reactive terminal groups and may be cyano (—CN) carboxy (—COOH) or amino-methyl (—CH₂NH₂).

In accordance with this invention, an organic compound having the above formula, in which X and X' are cyano groups, may be produced by reacting monochloro trimethyl acetonitrile with an alkali metal or alkaline earth metal sulfide, preferably in non-aqueous solution. This reaction can be carried out most advantageously by bringing together the monochloro trimethyl acetonitrile and the sulfide in the presence of a non-aqueous solvent which will dissolve, partially or completely, said substances and which, of course, is substantially chemically inert thereto. The solvent reaction medium is preferably heated to a temperature above the boiling point thereof during the reaction, with means provided for refluxing the reaction mixture.

Aliphatic compounds having a sulfur linkage and reactive terminal groups have been heretofore produced by reacting an alpha-omega chloro-cyano aliphatic compound with an alkali metal sulfide. Aliphatic sulfur-linked compounds containing reactive terminal groups produced by previously known processes were relatively unstable at elevated temperatures. Such previously known sulfides, upon heating to an elevated temperature, would evolve hydrogen sulfide and probably unsaturated by-products. They are, therefore, unsuited for uses in which they must be subjected to elevated temperatures.

In contrast to such previously known sulfides, the sulfur-linked aliphatic compounds having reactive terminal groups of my invention contain no hydrogen on the carbon atom beta to the sulfide group, and, as a consequence, these compounds can be subjected to high temperatures repeatedly or for long periods of time without evolving hydrogen sulfide by thermal decomposition.

The following example is given to illustrate a preferred method for producing the thermally stable sulfides of the present invention. The details set forth in the example are not to be taken as limitative of the invention.

*Example I*

A solution of sodium sulfide in the monomethyl ether of ethylene glycol was prepared by the addition of 117 parts of metallic sodium to 1200 parts of the ether, followed by the addition of 87 parts of hydrogen sulfide. This procedure was carried out in a reaction vessel fitted with a reflux condenser and provided with a jacket through which cool water could be circulated. The sodium was allowed to completely dissolve in the ether before the hydrogen sulfide was added. Steam was then admitted to the jacket of the reactor and the sodium sulfide solution heated to reflux. Six hundred (600) parts of monochloro trimethyl acetonitrile was then added to the refluxing reactants as rapidly as possible. Reflux was continued for one hour after the addition of the nitrile was complete. The contents of the reactor were cooled to approximately 80° C., and then pumped through a filter which served to retain the sodium chloride which was formed. The filter cake was washed with an additional quantity of the monomethyl ether of ethylene glycol and these washings were then combined with the main filtrate. The combined liquid was then stripped of the ether in a fractionation column at 100 mm. pressure. Following the removal of the ether, a fraction of unreacted monochlor trimethyl acetonitrile was then secured. When this unreacted material had been completely removed, the product was fractionally distilled at 5 mm. pressure. At 5 mm. pressure, bis (cyano methyl propyl) sulfide distills at a constant temperature of 155–156° C. When operating under the above conditions, 71% of the monochloro trimethyl acetonitrile is converted to bis (cyano methyl propyl) sulfide in an 88% yield.

The product is secured as a colorless practically odorless liquid solidifying to a white solid which melts sharply at 66° C. For further identification of this material, sulfur and nitrogen determinations were carried out.

|  | Calculated | Found |
|---|---|---|
|  | Per cent | Per cent |
| Sulfur | 16.4 | 16.9 |
| Nitrogen | 14.3 | 14.2 |

The monochloro trimethyl acetonitrile used in carrying out the process of the present invention may be produced by the chlorination of trimethyl acetonitrile as described, in detail, in my copending application Serial No. 580,701, filed March 2, 1945.

The use of monomethyl ether of ethylene glycol as the reaction medium is preferred in view of the higher yields obtainable thereby. Other reaction media may, however, be used, for example, lower aliphatic alcohols, such as methanol or ethanol; or other ether alcohols, such as ethylene glycol ethyl ether, or tetra hydrofurfuryl alcohol. Any reaction medium to be used should, of course, dissolve, partially or completely, both the sulfide and the monochloro trimethyl acetonitrile, and it should be substantially chemically inert to the reactants.

Any alkali metal sulfide, for example, sodium or potassium sulfide, or alkaline earth metal sulfide, for example, magnesium, calcium, barium, or strontium sulfide, may be used in carrying out the process of this invention. Preferably, the sulfide is formed in the reaction medium as disclosed in the above example, whereby a substantially anhydrous reaction mixture is formed. If desired, however, commercial grades of alkali metal or alkaline earth metal sulfides, including anhydrous sulfides as well as sulfides containing up to 30% water of hydration, can be used for this purpose.

In order to carry out the reaction of this invention rapidly it is greatly to be preferred to operate at a temperature above the boiling point of the solvent reaction mixture with means provided for reflux of the reaction mixture. The temperature at which the reaction is carried out may, however, vary in accordance with the boiling point of the reaction medium used. The reaction can be carried out below the boiling point of the reaction mixture if sufficient time is given for the reaction to take place.

The bis (cyano methyl propyl) sulfide may be hydrolyzed to form the bis (carboxy methyl propyl) sulfide, or it may be hydrogenated to form the bis (amino dimethyl propyl) sulfide.

The following example is given to illustrate the hydrolysis of the bis (cyano methyl propyl) sulfide to form the carboxy derivative.

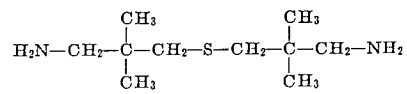

*Example II*

In a glass-lined reactor is placed 100 parts of concentrated sulfuric acid. To this acid, 24 parts bis (cyano methyl propyl) sulfide is then added with stirring. The contents of the reactor are then heated to 65-70° C. for one hour, during which time the sulfide goes into solution. The reactants are then diluted with an equal weight of water which is allowed to flow slowly into the reactor with stirring. The addition of this water is customarily sufficient to raise the temperature of the contents of the reactor to reflux. The material in the reactor is then heated and maintained at reflux for one hour. The contents of the reactor are then pumped through an acid-resistant filter and the filter cake washed with a small quantity of cold water. When the filter cake is dried, the product melts sharply at 162-163° C., and is obtained in 85-95% of the theoretical yield. For complete identification of the product [bis (carboxy methyl propyl) sulfide], the white crystals were analyzed for sulfur and nitrogen.

|  | Calculated | Found |
|---|---|---|
|  | Per cent | Per cent |
| Sulfur | 13.7 | 14.0 |
| Nitrogen | 0.0 | 0.0 |

In addition, the neutral equivalent was determined and found to be 116.5 compared to a theoretical neutral equivalent of 117.

The above sulfide, containing two terminal carboxy groups, is sufficiently stable to be of value in the preparation of polyamide compositions, allowing temperatures of over 220° C. to be used in the polyamide formation, and in the preparation of diesters which are of value as plasticizers for resinous materials containing halogen, such as polymers and copolymers of vinyl or vinylidene chlorides. The stability of these compounds is adequate for these uses.

The following example illustrates the preparation of the diamine:

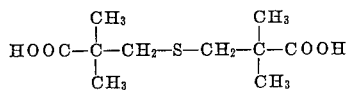

*Example III*

Twenty-four (24) grams of bis (cyano methyl propyl) sulfide were dissolved in 400 cc. of absolute ethanol in a one-liter, three-necked flask equipped with a mechanical stirrer and an efficient reflux condenser. The solution was brought to reflux by means of a steam bath and, with stirring, 50 grams of sodium strips was added to the refluxing solution as rapidly as the refluxing capacity of the condenser would permit. After all of the sodium had reacted, the excess alcohol was distilled from the solution to which an excess of water was then added. The solution was cooled and extracted with ether. The extract was concentrated by distillation and the concentrate was distilled under reduced pressure.

B. P. _____ 140° C./2 mm.
Yield _____ 10 g. (40%)
Neutral equivalent _____ 104.7 (theoretical: 103)

The above diamine is also of value in the preparation of polyamide compositions, allowing polyamide formation at temperatures in excess of 220° C. The stability of this diamine is extraordinary as a sulfur containing material.

The sulfur-linked aliphatic compounds of the present invention, which have a high thermal stability, have particular utility as intermediates in the production of synthetic linear polyamides of the type referred to in U. S. Letters Patents Nos. 2,071,250; 2,071,253; 2,130,948; 2,252,554; and 2,285,009, and in the preparation of high boiling esters which are valuable as plasticizers for resinous materials. In both of these uses, the presence of a stable sulfur compound results in the impartation of desirable characteristics to the compositions. In both of these applications, attempts to use the corresponding sulfur-linked materials disclosed in the prior art have been unsuccessful due to the thermal instability of those materials.

Since it is obvious that many changes and modifications can be made in the above described details without departing from the nature and spirit of the invention, it is to be understood that the invention is not to be limited to said details except as set forth in the appended claim.

I claim:

Bis (amino methyl propyl) sulfide.

OLIVER W. CASS.

REFERENCES CITED

The following references are of record in the file of this patent:

Loven, Beilstein (4th ed., 1921), vol. 3, p. 319.